United States Patent [19]
Andrews

[11] Patent Number: 6,065,556
[45] Date of Patent: *May 23, 2000

[54] VARIABLE WHEEL BASE VEHICLE

[75] Inventor: William Andrews, Cambewarra, Australia

[73] Assignee: Van William Concepts Pty. Ltd., Coolongatta, Via Berry, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/793,690

[22] PCT Filed: Aug. 30, 1995

[86] PCT No.: PCT/AU95/00557

§ 371 Date: Apr. 24, 1997

§ 102(e) Date: Apr. 24, 1997

[87] PCT Pub. No.: WO96/06768

PCT Pub. Date: Mar. 7, 1996

[30] Foreign Application Priority Data

Aug. 30, 1994 [AU] Australia ................. PM-7775

[51] Int. Cl.⁷ ..................................... B62D 21/14
[52] U.S. Cl. ................. 180/209; 180/242; 280/638; 280/149.2
[58] Field of Search ................. 280/638, 758, 280/149.2, 43.15, 43.16; 180/209, 906, 233, 242

[56] References Cited

U.S. PATENT DOCUMENTS

| | | |
|---|---|---|
| 2,119,800 | 6/1938 | Tull .......................................... 280/638 |
| 3,133,651 | 5/1964 | Cripe . |
| 3,565,273 | 2/1971 | Hahn ......................................... 214/674 |
| 3,633,702 | 1/1972 | Shaw ......................................... 280/638 |
| 3,670,910 | 6/1972 | Shaw ......................................... 280/638 |
| 3,791,540 | 2/1974 | Breitfuss ................................ 280/638 |
| 3,856,149 | 12/1974 | Shaw ......................................... 280/638 |
| 4,030,560 | 6/1977 | Parquet et al. ........................ 180/6.48 |
| 4,049,138 | 9/1977 | Soyland ................................ 280/149.2 |
| 4,204,697 | 5/1980 | Santerre ................................ 280/149.2 |
| 5,368,121 | 11/1994 | Priefert ................................... 180/209 |

FOREIGN PATENT DOCUMENTS

| | | |
|---|---|---|
| 3447052 | 6/1986 | Germany . |
| 1369649 | 10/1974 | United Kingdom . |
| 1465891 | 3/1977 | United Kingdom . |

*Primary Examiner*—Paul N. Dickson
*Attorney, Agent, or Firm*—Lowe Hauptman Gopstein Gilman & Berner

[57] ABSTRACT

A variable wheel base vehicle includes a vehicle body having front end rear ends supporting body members one of which is capable of displacement relative to the other. Drive motors mounted to the vehicle body are linked to the body members. A carriage assembly including drive wheels provide support for the vehicle body. An extension assembly responsive to the drive motor is connected to at least one of the body members. Upon actuation of the drive motor, the extension assembly enables one body member to displace relative to the other body member to enable extension and retraction of the vehicle wheel base. Each body member includes at least one wheel of the carriage assembly and, as a result of displacement of one body member relative to the other body member, the displaced body member provides increased counterbalance in the vehicle.

17 Claims, 13 Drawing Sheets

VARIABLE WHEEL BASE VEHICLE

BACKGROUND

The present invention relates to motor vehicles and particularly, though not exclusively to vehicles capable of performing heavy duty work functions such as loading and more particularly relates to improvements in the construction, operation and stability of such vehicles. More particularly the invention relates to a variable geometry vehicle wherein at least the wheel base can be extended to provide a counterbalance for loading which would otherwise tend to destabilise the vehicle. Whilst the present invention will be described primarily with reference to skid steer vehicles, it will be understood by persons skilled in the art that the invention is not limited to vehicles able to perform loading functions but is applicable to a wide variety of vehicles capable of performing functions other than loading.

PRIOR ART

There are in existence a number of different types of loaders each designed to perform the functions of lifting and loading. The configurations of the known loaders are largely dictated by the function each performs. Among the known loaders are skid steer loaders, fork lifts, front end loaders and backhoes with the latter having front end loading capability.

Skid steer loaders are well known vehicles which generally comprise, a vehicle body of monocoque construction having drive means mounted in or on the body, two sets of wheels attached to and supporting the body and a work implement such as a front end loader assembly attached to the vehicle body. The skid steer loader was developed as a very compact, relatively light and very manoeuvrable vehicle. It is therefore able to be transported in small tippers to building and work sites and is very useful in confined areas providing reasonable pushing and loading ability. One such skid steer loaders having a very short wheel base has proven to be successful as an easily transportable earth mover capable of detachably receiving a variety of work implements and in being able to do so replacing larger and more expensive machines eg. (backhoes, diggers, etc.) Despite these advantages these skid steer loaders are known to be inherently unstable in operation. As they are short wheel base vehicles, they rely to some extent for operational stability on the weight of the drive assembly, particularly the motor, which is generally mounted rearward to provide counterbalancing for the front end work implement and, in view of the overall geometry of the machine, it must therefore adopt a balance compromise. Thus, if the rear of the machine is weighted too heavily for the purpose of allowing a large payload bucket lift, the machine would rear up trying to negotiate minor slopes and obstructions particularly when the bucket is empty. Alternatively, if the rear of the machine was weighted too lightly, it would not lift a reasonable payload and would be susceptible to forward rotation about the front wheels.

Previously, skid steer loaders have needed to be rear heavy to lift weights and although not designed specifically for this purpose, to allow the machine to climb steep slopes backwards where necessary, and to allow pick up of a reasonable payload in the bucket during each lift. Rear weighting has thus proven to be the best possible compromise in a very short wheel base machine. Thus, when negotiating very steep slopes for safety the existing short wheel base skid steer loaders are preferably reversed up slopes where practical but are limited to only moderate slopes when travelling forward and when the bucket is empty particularly when the bucket is in the air.

The dynamic forces distributed over this machine in use are quite complex and along with the short wheel base contribute to the machines inherent instability. The dynamic loads on the existing machines vary according to a number of factors taken separately or in combination with other factors which include; the speed at which the machine is driven during operation, the load carried in the loading assembly bucket, the height of the bucket lift, the roughness of the terrain on which the loader is driven, the level of tire inflation, the severity of acceleration and deceleration (or braking), the slope of the surface on which the machine operates and the heaving and lateral loads induced when steering right or left.

An unskilled driver can easily create instability problems inadvertently whereby the machine can quite easily overturn. A skillful driver is one who can constantly and speedily compensate for inherent instability problems in the known short wheel base skid steer vehicles. This causes performance of work functions by the machine to be much slower than they otherwise could be were the machine more stable.

The existing skid steer vehicles are positively dangerous in some use operations and configurations. For instance, where a load is lifted high, the potential for overturning of the machine is great and can be exacerbated by rapid deceleration. When the same load is carried low down the tendency for frontward overturning remains however, the loader bucket will engage the ground before overturning occurs. Thus, when an operator is carrying a load in the bucket it is strongly advisable to carry the bucket near the ground as the machine is in these circumstances both laterally more stable and more able to counter the tendency towards overturning.

Skid steer loaders are known to be able to negotiate flat ground when loading a truck. On moderate and steep slopes these loaders have been known to simply roll over backwards due to the change in balance distribution during the loading and particularly the unloading phase. The need to constantly position the bucket low to improve the balance geometry increases cycle time during loading and unloading. The engine in the known skid steer loaders is mounted rearward to provide a restoring moment to balance the effect of the overturning moment induced in the machine by the loaded bucket. The above described phenomenon is magnified where the operator is working on a forward or side slope. Also, rough terrain makes it very dangerous for the operator to operate safely as there is an increased tendency for the machine to overturn forward, laterally or rearward.

When another working implement is attached to the above described skid steer loaders such as a ditch digging implement, stability problems are still manifest. Indeed, if the working implement weigh less than the aforesaid bucket, stability problems are exacerbated.

Another vehicle susceptible to instability is the conventional fork lift. This commonly used loader generally comprises a drive assembly located in a body mounted on a wheel assembly or chassis or is alternatively of monocoque construction. The chassis includes a wheel assembly which defines a relatively short wheel base (though longer than that of the typical skid steer loader) and typically at the front of the vehicle there is a generally upright frame which supports a set of lifting forks able to travel in the vertical and/or horizontal direction.

The forks in these vehicles usually lie well forward of the wheel base footprint. Heavy loads applied to the forks induce forward rotation in the vehicle about the front wheels. The heavier the load the greater the tendency for forward rotation. Unwanted rotation is to an extent counterbalanced by the weight at the rear of the vehicle including the drive motor. The fork lift operator must be skilful enough to ensure that the machine is not loaded beyond capacity or driven in a way that compromises safety. Thus, the instability of the machine can result from the manner in which the machine is driven and the geometry of both the load and the machine. The potential for instability of this machine is taken into account when training fork lift operators. However, in some instances it may be difficult to judge just how heavy a load is and thus to compensate adequately to avoid overturning laterally or forwards. There is therefore a need to enhance the stability of short wheel base vehicles including hereinbefore described but without compromise to existing advantageous features in these vehicles.

As skid steer loaders are inherently unstable machines, due largely to their short wheel base, the potential for accidental overturning of the machine during normal use is high. In response to this, manufacturers have examined the possibility of improving machine stability by increasing the wheel base. However, due to the compact nature of these machines and the limited space in or on the vehicles to house any additional componentry which can enhance stability, the mechanical options are very limited. Consequently, only small increases have been made to the wheel base in the order of 100 mm. In practice, the skid steer concept necessitates a short wheel base to allow efficient turning ability but an increase in wheel base length to increase stability. Thus, a fixed increase in wheel base compromises the machines ability to turn requiring additional horsepower. This also results in increased tire wear. For these and other reasons manufacturers have been restricted to the small and fixed increase in wheel base.

The present invention seeks to overcome or at least ameliorate the aforesaid disadvantages of certain prior art vehicles particularly though not exclusively skid steer and fork lift vehicles and without compromise to the existing advantageous features of such vehicles by providing a variable geometry vehicle with enhanced operational stability characteristics and means to allow selective variation to the length of the wheel base either during operation or whilst the vehicle is stationary.

According to one form of an apparatus aspect of the invention there is provided a variable geometry vehicle having a vehicle body comprising body members at least one of which is adapted to extension and retraction relative to at least one other body member resulting in extension of the wheel base to thereby enhance the dynamic stability and/or balance geometry of the vehicle during operation.

In one broad form the present invention comprises:
a variable geometry vehicle able to move between a retracted working configuration and an extended working configuration wherein the extension and retraction is effected by means of at least one hydraulic extension assembly integral with or connected to the vehicle and wherein as a result of said extension, the wheel base of the vehicle is increased. According to a preferred embodiment the vehicle is either a fork lift or skids steer loader.

In another broad form the present invention comprises:
a variable geometry vehicle comprising:
a vehicle body having front and rear ends and including body members at least one of which is capable of displacement relative to another body member,
drive means in or on said vehicle body operably linked to one or more said body members,
a carriage assembly including drive wheels providing support for the vehicle body,
an extension assembly responsive to the drive means and connected to at least one of the body members, and which upon actuation by said drive means enables one body member to displace relative to another body member thereby enabling extension and retraction of the vehicle's wheel base;
wherein each said body members include at least one wheel of said carriage assembly, and
wherein as a result of said displacement of one body member relative to another body member the displaced body member provides increased counterbalance in the vehicle.

According to a preferred embodiment there are two body members which together form the vehicle body each of which body members include two independently driven wheels and means enabling attachment of the body member to a member of said extension assembly such that actuation of the extension assembly causes longitudinal displacement of one body member relative to the other wherein the two independently driven wheels are integral with and move with the displaced body member. Preferably, the drive means includes a drive motor connected to and supported by the body member which displaces thereby contributing to said counterbalance.

In the preferred embodiment the vehicle is a skid steer loader having as a work implement a front end loader assembly although other work implements may be fitted to a vehicle having the extension facility such as but not limited to lifting, digging, breaking, pushing or towing equipment.

In another broad form, the present invention comprises:
a variable geometry four wheel skid steer loader or fork lift including in or on the body of the vehicle an extension assembly which enables selective increase in the vehicle's wheel base whilst stationary or during operation.

According to the preferred embodiment, the invention is applicable to a skid steer loader of the type which comprises a vehicle body of monocoque construction, a drive means wherein the vehicle body is mounted on a wheel assembly wherein a part of the vehicle body is able to move longitudinally relative to the remainder of the body. The separated components may be joined by one or more extension assemblies attached to the vehicle body. Each extension assembly may comprise a telescopic member of square or rectangular hollow steel section although it will be appreciated that other sections such as but not limited to triangular, elliptical or circular sections may be equally suited to the purpose. The telescopic member has a fixed member and a moving member wherein at least the fixed member is attached to the vehicle body and is actuated hydraulically by the vehicles hydraulic system or actuated by a self contained hydraulic system linked to the vehicle's motor. The result of the extension of the extension assembly is that the wheel base is extended and the self weight and applied loadings forward of the front wheel axis of the vehicle are counterbalanced.

In another broad form of the apparatus aspect the invention comprises:
an extension and retraction assembly for attachment to the body of a variable geometry vehicle to enable one body member of said vehicle to move longitudinally relative to another body member thereby increasing the wheel base of the vehicle, the assembly comprising:
at least one telescopic member having a fixed member fixedly attached to one body member of the vehicle and a moveable member which engages a moveable body member of the vehicle.

According to an alternative embodiment the telescopic member may include therewithin a telescopic actuation cylinder.

In another broad form the present invention comprises:

an extension and retraction assembly for fitting to a vehicle capable of performing a loading or other work function, the assembly enabling the body of the vehicle to undergo selective extension and retraction to alter the wheel base of the vehicle;

the assembly comprising:

at least one telescopic member having one sleeve member fixed to one part of the vehicle and another moveable member which engages another part of the vehicle wherein the telescopic member includes therein a telescopic hydraulic cylinder.

Preferably, the vehicle is a skid steer loader. The non-extended or retracted configuration of the skid steer loader body is essentially the same as the configuration of known skid steer loaders. Thus the advantageous features of conventional loaders are retained notwithstanding the application of the invention to the vehicle.

It will be understood that more than one extension assembly may be utilised with the vehicle. As with a single extension assembly these may be fitted inside the vehicle or mounted externally at the sides or underneath the vehicle body.

It is envisaged that the invention can be applied to existing vehicles such as skid steer loaders and fork lifts by retrofitting namely by dividing part of the vehicle body and introducing an extension assembly into the vehicle.

Depending upon whether the vehicle to which the assembly is fitted is skid steer or conventional steer, the wheel drive arrangements may require alteration to enable the extension assembly to be fitted to the vehicle so that each wheel may be driven separately or in pairs.

According to one form of the method aspect, the present invention comprises; a method for retrofitting an extension and retraction assembly to the body of a vehicle capable of receiving a work implement, the method comprising the steps of:

a) taking an existing vehicle, b) dividing the vehicle body and/or chassis into two parts to form body members or chassis parts, c) inserting at least one extension assembly into the vehicle having at least a fixed member which is fixedly attached to one of the body members or chassis parts; and d) a moveable member which moves within the fixed member and which is engages directly or indirectly the other of the two parts of the body or chassis whereupon the moveable member is slideable within the fixed member, e) installing control means in or on the body of the vehicle to control extension and retraction of one body part relative to the other part upon extension and retraction of said extension assembly.

The extension assembly or assemblies may be themselves hydraulically telescopic or actuated by a telescopic hydraulic actuation cylinder and may be themselves structural support beams which provide structural rigidity to the body members. Preferably, the relative movement between the body parts or sections is controlled hydraulically by the operator of the machine. According to another embodiment the extension assembly may be fitted to a fork lift vehicle.

The present invention will now be described in more detail according to a preferred but non-limiting embodiment and with reference to the accompanying illustrations wherein:

FIG. 1 shows an isometric exploded view of a variable geometry vehicle in the expanded configuration according to a preferred embodiment of the invention, FIG. 2 shows an isometric view of the vehicle of FIG. 1 in the unexpanded configuration, FIG. 3 shows from the front as located in a vehicle an abbreviated portion of the hydraulic hose assembly which joins the pump and control valve and which extends and retracts responsive to extension and retraction of the vehicle, FIG. 4 shows a side elevational view of the rear body member of FIG. 1 depicting a hose guide, FIG. 5 shows an isometric view of a skid steer loader in the unexpanded or retracted configuration according to a preferred embodiment of the invention, FIG. 6 shows the vehicle of FIG. 5 in the expanded configuration, FIG. 7 shows an isometric view of a variable geometry vehicle having two telescopic extension members, FIG. 8 shows a schematic arrangement of the hydraulic system for a variable geometry vehicle with hydraulics to accommodate actuation of an extension assembly, FIG. 9 shows a cross sectional plan view of a telescopic member according to one embodiment;

The present invention will now be described with reference to the above figures and particularly in its application to vehicles known generically as skid steer loaders hereinbefore described. Although the invention will be described with reference to skid steer and fork lift vehicles this is not to be construed as limiting of the applications of the invention.

A typical skid steer loader comprises a vehicle body mounted on a wheel assembly, a drive motor mounted in or on the body, a control cockpit, loader arms or other working attachment and a hydraulic system to actuate the working attachment.

Figure 1:
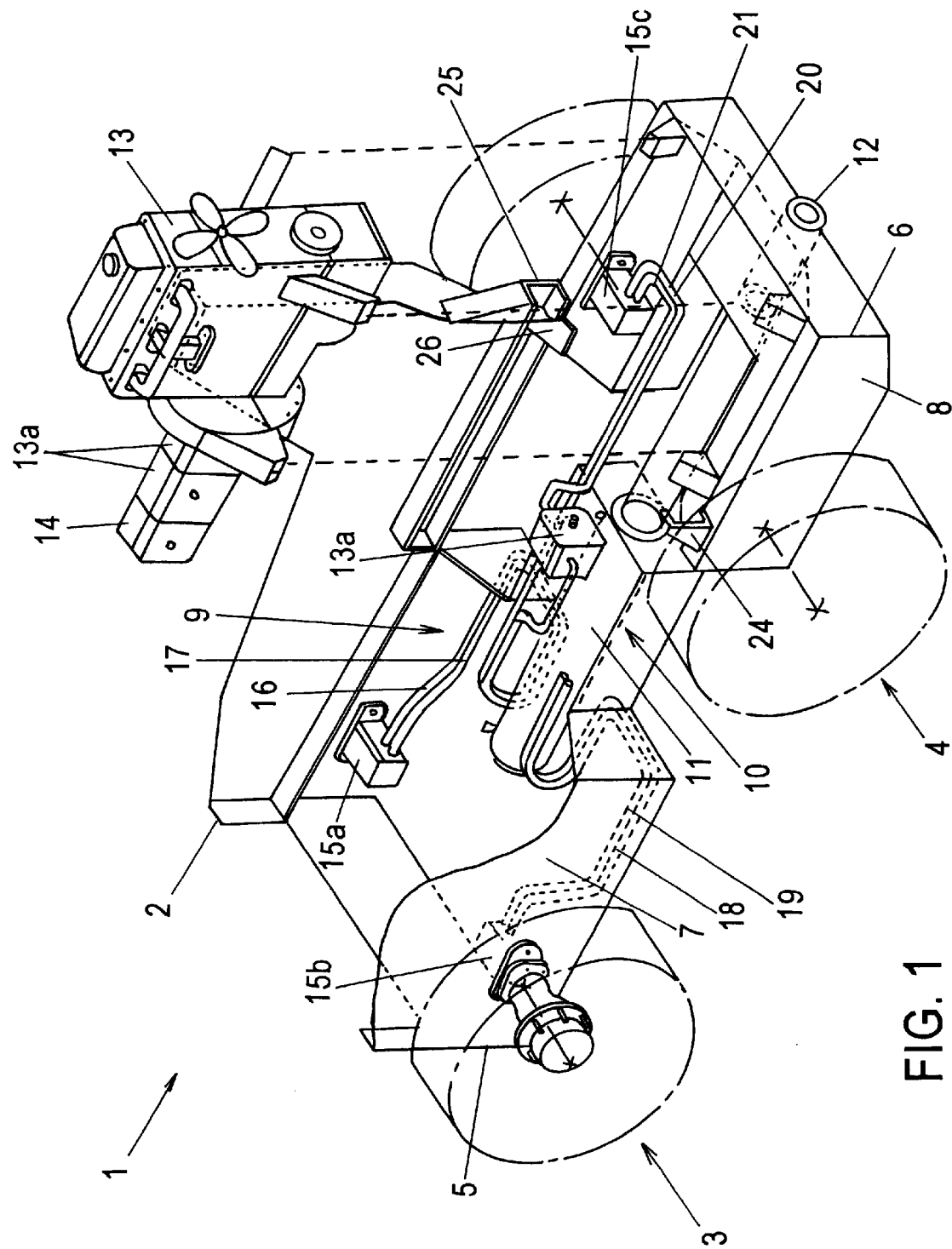

Referring to FIG. 1 there is shown an isometric exploded view of a typical skid steer loader 1 having a body abbreviated for clarity. Vehicle body 2 is mounted on wheel assemblies 3 and 4 each of which comprises a pair of wheels attached at or near front and rear ends 5 and 6 respectively of vehicle body 2. Skid steer loader bodies of the type shown are generally of monocoque construction wherein the vehicle body acts as a chassis to which the wheel assemblies 3 and 4 are integrally mounted. According to a preferred embodiment, vehicle body 2 may be generally divided into body members 7 and 8 each of which include wheel assemblies 3 and 4 respectively. The known vehicle bodies are integrally constructed and have no facility for extension in their length or for extension of the wheel base relative to or with part of the vehicle body.

According to the embodiment shown, vehicle 2 has the ability to increase its wheel base by virtue of an overall increase in the length of the vehicle body. The length increase is obtained by means of displacement of one body part relative to another body part. Thus, body member 8 displaces relative to body member 7. The relative separation of body members 7 and 8 is effected by means of an extension assembly 9. Extension assembly 9 includes a telescopic member 10 comprising a fixed female hydraulic member 11 and moveable member 12 responsive to actuation of the vehicle hydraulics. Preferably, the telescopic member is cylindrical but it will be appreciated that the telescopic member can be manufactured from alternative sections such as but not limited to rectangular, square or diamond shape. Preferably, member 11 is fixedly connected to body member 7 so that it cannot move relative to body member 7. Moveable member 12 engages or is fixed to and moves with body member 8 and in view of the engagement which may be rigid fixation between member 12 and body 8 when the extension assembly 9 is actuated, member 12 causes body member 8 to displace in a rearward direction and away from body member 7. Fixed member 11 may be bolted, screwed, welded or otherwise connected to body member 7. Likewise for moveable member 12 it may be bolted, welded or screwed or otherwise connected to body member 8. Extension assembly 9 operates in response to the vehicles drive system which includes drive motor 13. Drive motor 13 provides drive to hydraulic piston pumps 13a and hydraulic ancillary pump 14. Hydraulic piston pumps 13a engage a network of hydraulic hoses which travel from the pump to the wheel motors to provide drive for the wheels. Pump 14 provides hydraulic power via a control valve to the extension assembly 9 enabling movement of body member 8 relative to body member 7 upon actuation by an operator of an actuation switch (not shown). Each wheel of wheel assemblies 3 and 4 comprise a wheel motor 15 which transfers drive to the associated wheel. There are three wheel motors depicted in FIG. 15a, 15b and 15c with the remaining fourth wheel motor not shown for clarity. Due to the capability of vehicle body 1 to undergo extension and retraction, it is necessary to provide hydraulic hoses associated with the hydraulics which accommodate the extension. To this end, there are provided hoses 16 and 17 having additional length to accommodate extension in the vehicle and which pass between hydraulic piston pumps 13a and wheel motors 15. Likewise, hoses 18 and 19 are of sufficient length to undergo extension upon extension of body member 8 relative to body member 7. In order to accommodate the additional length when the vehicle is in the extended configuration, hoses 16, 17, 18 and 19 travel in guides which facilitate easy unrolling and rolling of the hoses (see FIG. 3). In addition to the extendable hoses there are hoses 20 and 21 which span between hydraulic piston pumps 13a and wheel motor 15. Hoses 20 and 21 are of fixed length as body member 8 preferably supports the drive assembly which includes drive motor 13 and hydraulic pumps 13a and 14. Thus, in a preferred embodiment, the motor and pumps move rearwardly with the rearward movement of body member 8 in response to actuation of extension assembly 9. In the embodiment where drive motor 13 and the associated pumps 13a and 14 are able to move rearward, the motor provides additional counterbalance for loads applied to the front end of the vehicle. According to an alternative embodiment, motor 13 and hydraulic pumps 13a and 14 are fixedly attached to member 7 such that body member 8 moves relative to body member 7 and also relative to pumps 13a and 14 and drive motor 13 (see description of FIG. 11).

Figure 2:
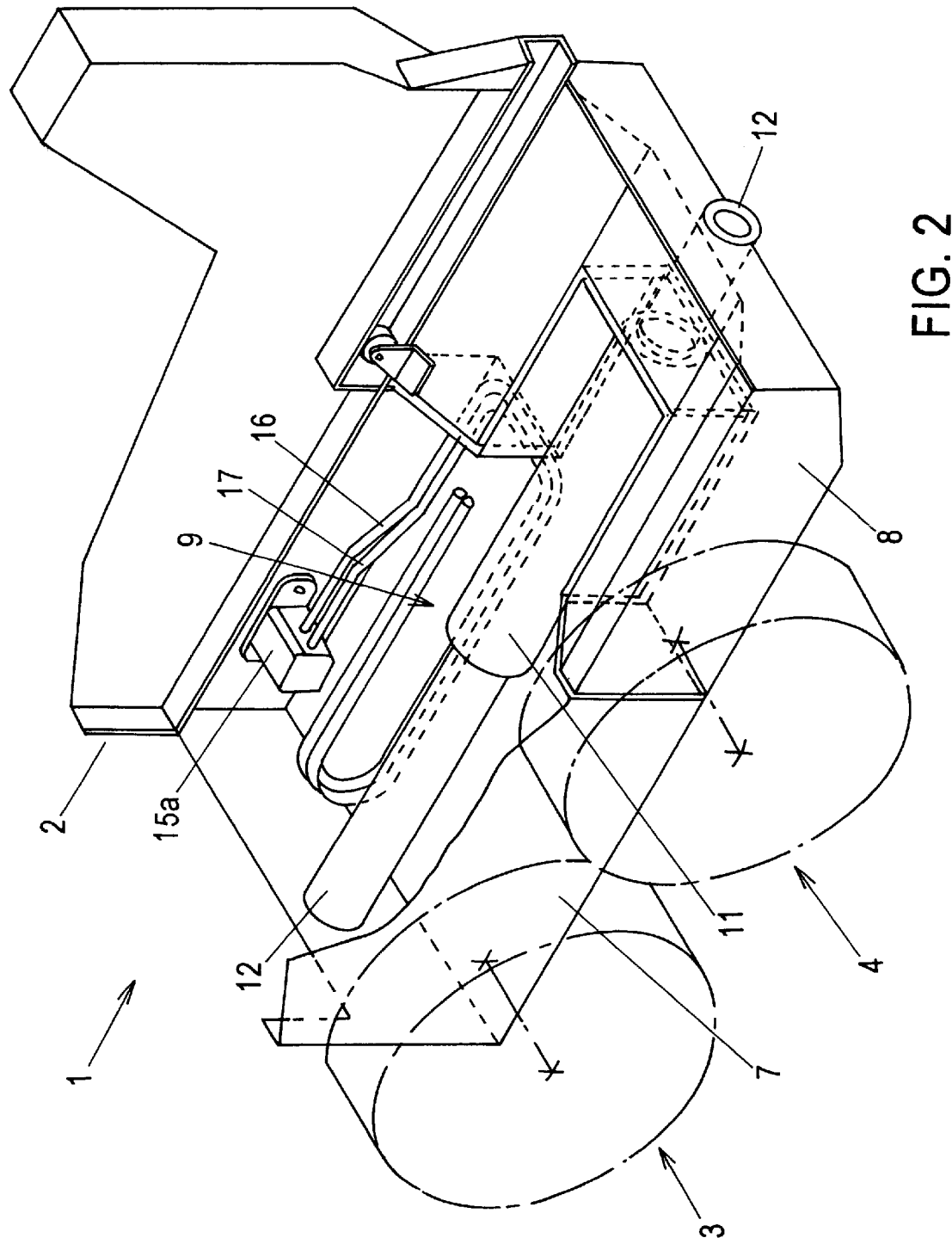

FIG. 2 shows the vehicle of FIG. 1 in the retracted configuration wherein body members 7 and 8 are shown in abutting relationship. In FIG. 2 it can be seen that the vehicle when retracted conforms to the shape of a conventional vehicle of this type and that the extension assembly 9 is fully concealed within the vehicle. When the vehicle is to be returned from the extended configuration to the retracted configuration the operator actuates the vehicle hydraulics and this causes actuation of the extension assembly 9. The retraction of the extension assembly 9 enables moveable member 12 to travel through fixed member 11 (the latter acting as a support guide) and terminating at the front end of the vehicle body i.e. at body member 7.

Figure 3:
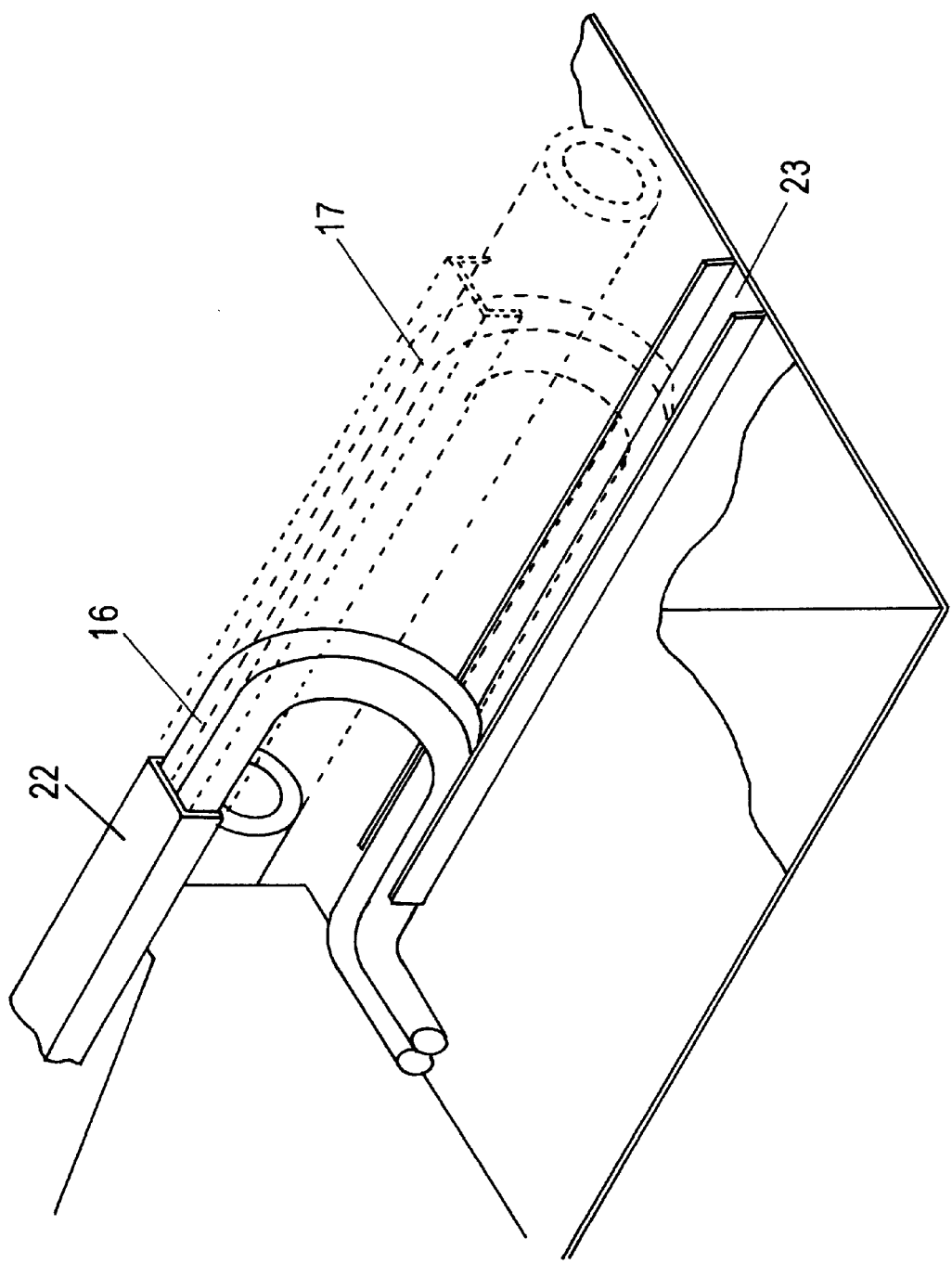

FIG. 3 shows an enlarged front end abbreviated view of the arrangements for furling and unfurling the hoses 16 and 17. Hoses 16 and 17 travel in specially fabricated upper and lower channels 22 and 23 respectively. Channel 23 is preferably welded to body member 7 and channel 22 is attached to body member 8. Each of channels 22 and 23 assist in guiding hoses 16 and 17 during extension and retraction of the vehicle. Likewise, hoses 18 and 19 are accommodated in a similar manner. Similarly, other components of the vehicle must be able to expand and retract and for this purpose other vehicle items (not shown) such as wiring fuel lines and control mechanisms for the hydrostatic transmission must have roll out roll in capability.

Figure 4:
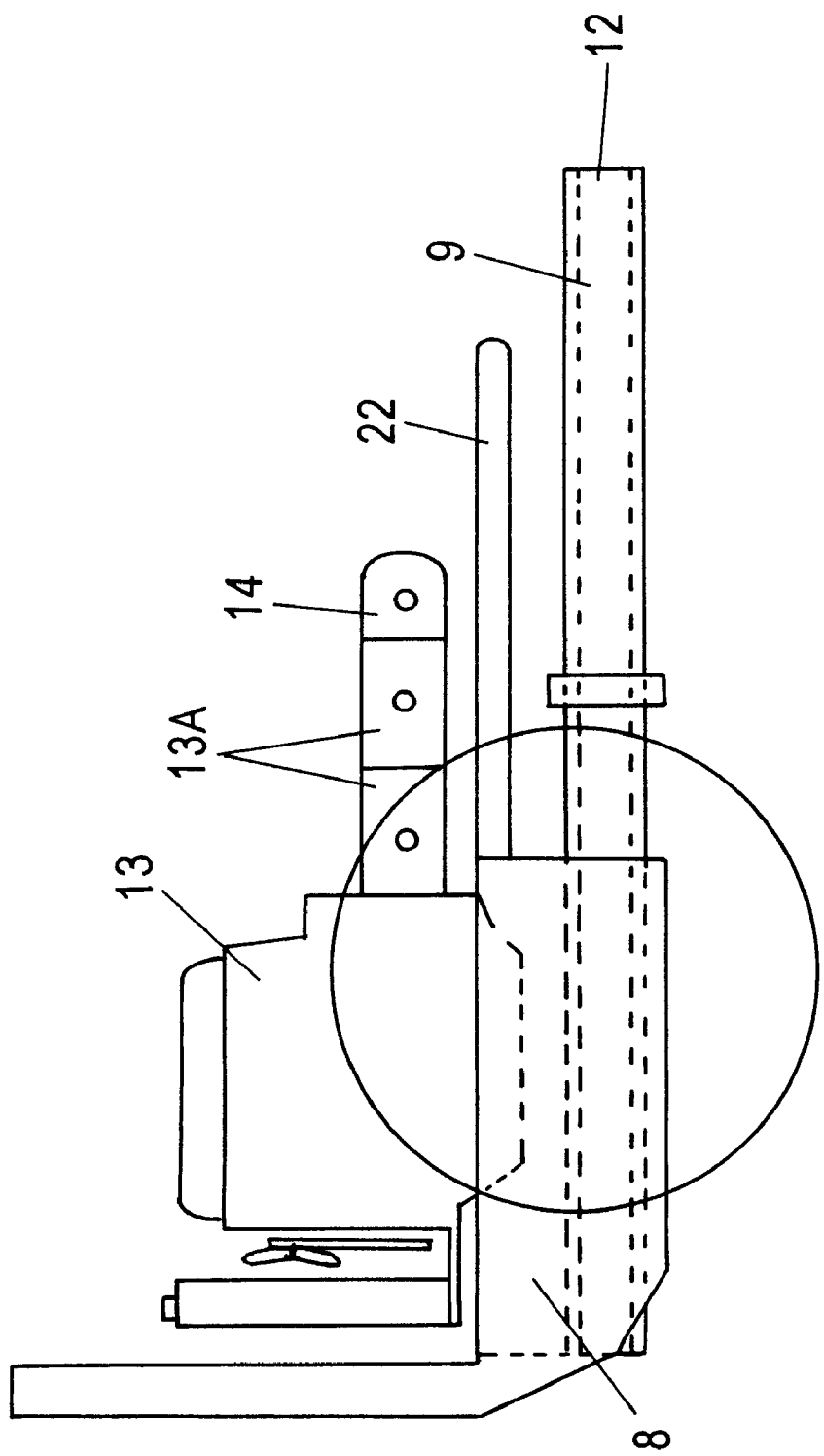

FIG. 4 shows a side elevational view of a body member 8 exploded from the vehicle of FIG. 1. This illustrates the relationship of channel 22 to body member 8 as shown in abbreviated form in FIG. 3. FIG. 4 also shows motor 13 connected to pumps 13a, ancillary pump 14 and moveable member 12.

Preferably the monocoque vehicle body is divided in such a way that two primary body members are formed. According to the preferred embodiment extension assembly 9 is located along the mid line of the vehicle when only one extension assembly is used. Where two or more extension assemblies are used it is preferably that these be located symmetrically about the longitudinal axis to prevent the possibility of binding during the extension phase. Each of the wheels which comprise wheel assemblies 3 and 4 are separately driven by means of separate drive motors which are linked to the vehicle hydraulics. Extension assembly 9 may either have its own hydraulic reservoir and associated actuation means or it may simply be incorporated into the vehicles existing hydraulic system.

Figure 5:
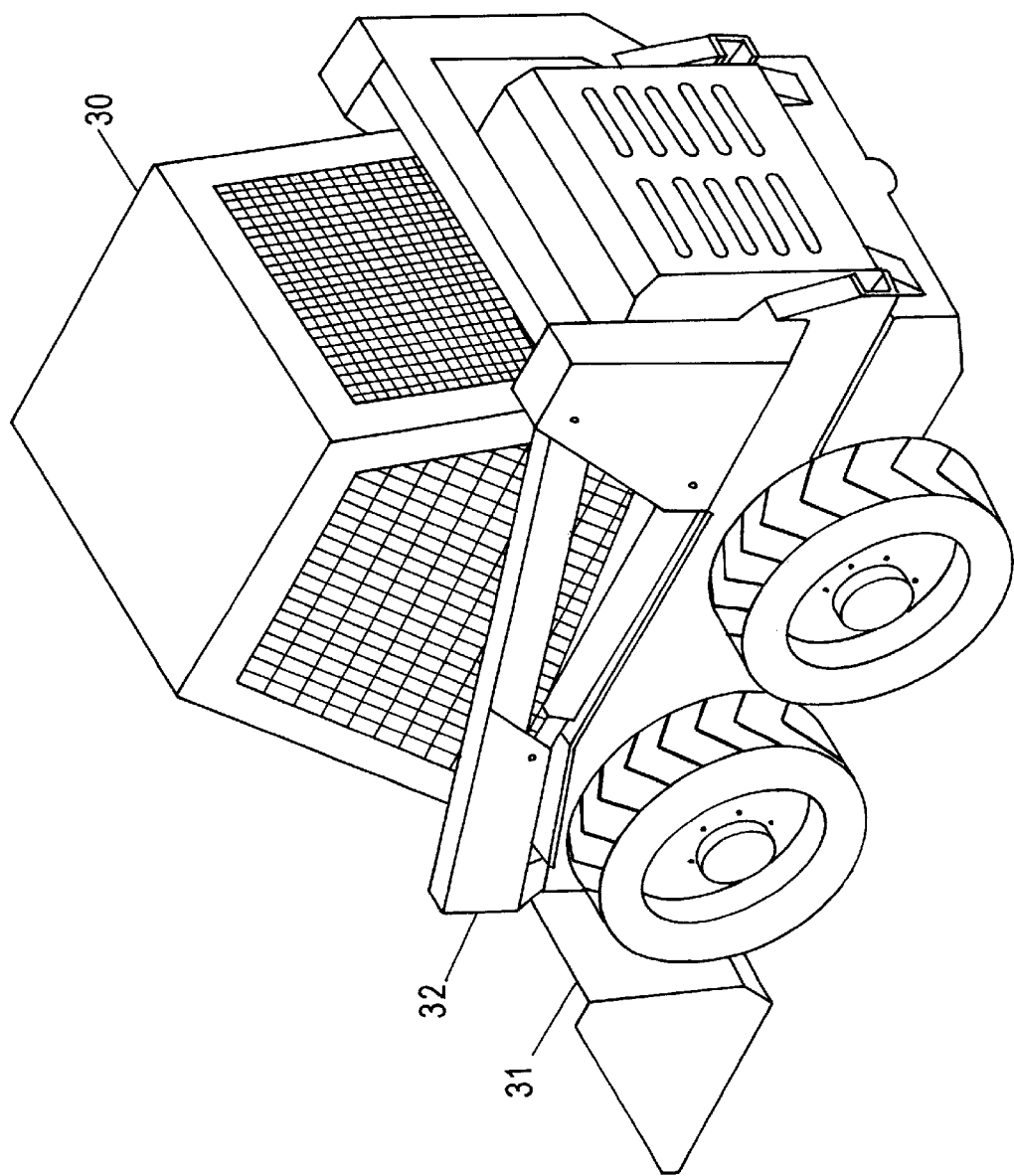

FIG. 5 shows a rear perspective view of a typical skid steer loader 30 in unexpanded configuration including front end bucket 31 and associated lifting arms 32. This vehicle is shown in the retracted configuration and when in this configuration has the appearance of a conventional skid steer loader.

When a circular telescopic member as is depicted for extension assembly 9 (see FIG. 1), there is a potential for rotational instability. In order to overcome this problem roller guides 24 and 25 are provided which accommodate rollers connected to body member 8. For clarity, FIG. 1 shows roller assembly 26 but does not show the roller assembly which travels in roller guide 24. This interaction between roller guides and corresponding roller assemblies prevent any unwanted rotation of body member 8 in relation to body member 7. Roller assembly 26 and the corresponding roller assembly which travels in roller guide 24 may include horizontal rollers which improve lateral stability.

Figure 6:
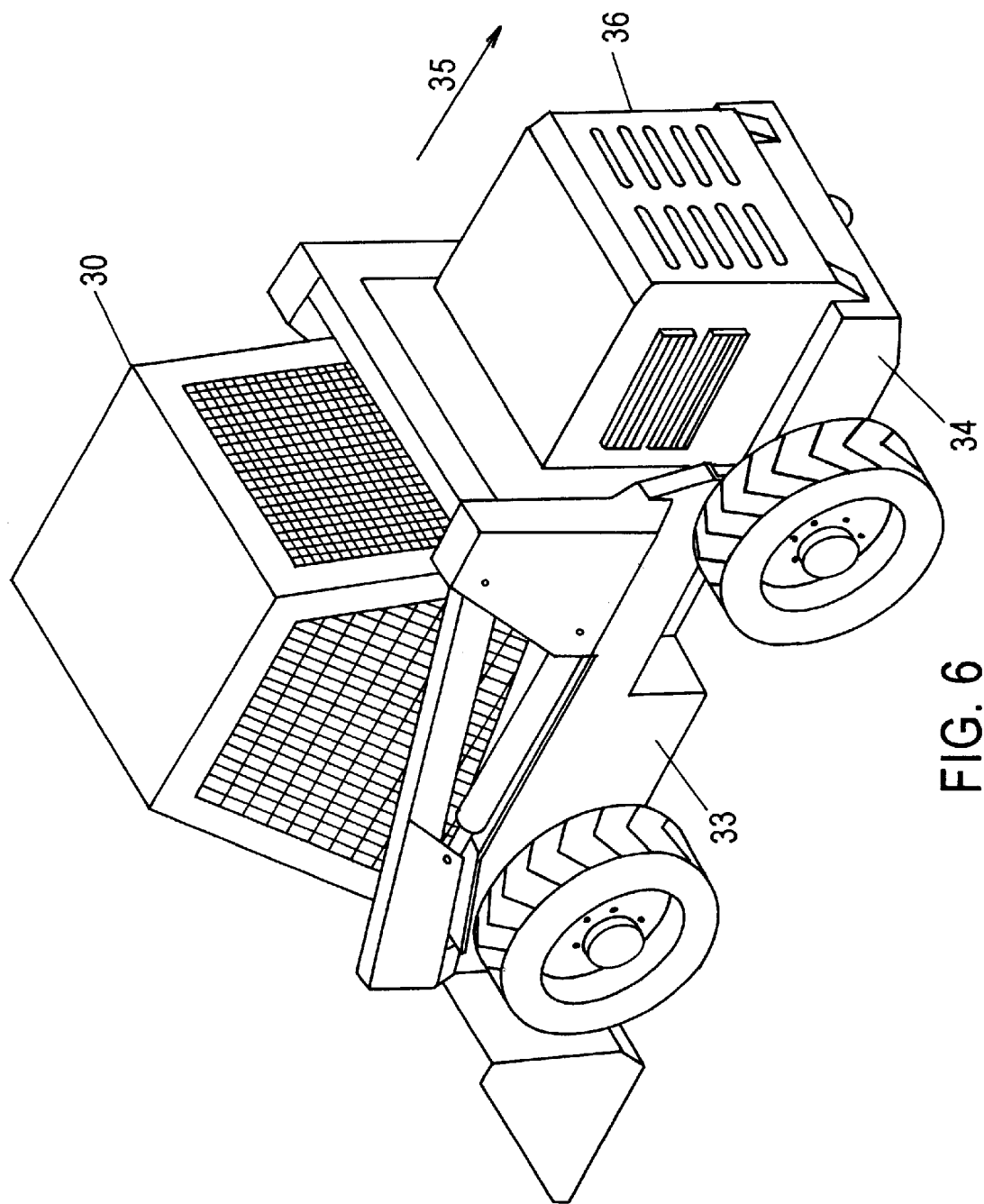

Referring now to FIG. 6 there is shown vehicle 30 of FIG. 5 in the extended configuration. From this view it can be seen that body member 34 is moved rearwardly in the direction of arrow 35 relative to body member 33. Body member 34 includes housing 36 which houses the major parts of the vehicle drive assembly including the drive motor and hydraulic transmission and hydraulic pump. The rearward movement of body member 34 in this way provides a counter balance for loading applied to bucket 31 and hence provides a high resistance against overturning longitudinally. When the vehicle is retracted as shown in FIG. 4 the vehicle retains all the characteristics of the prior art vehicle and thus the arrangements which enable extension of the vehicle are virtually fully concealed from view.

Figure 7:
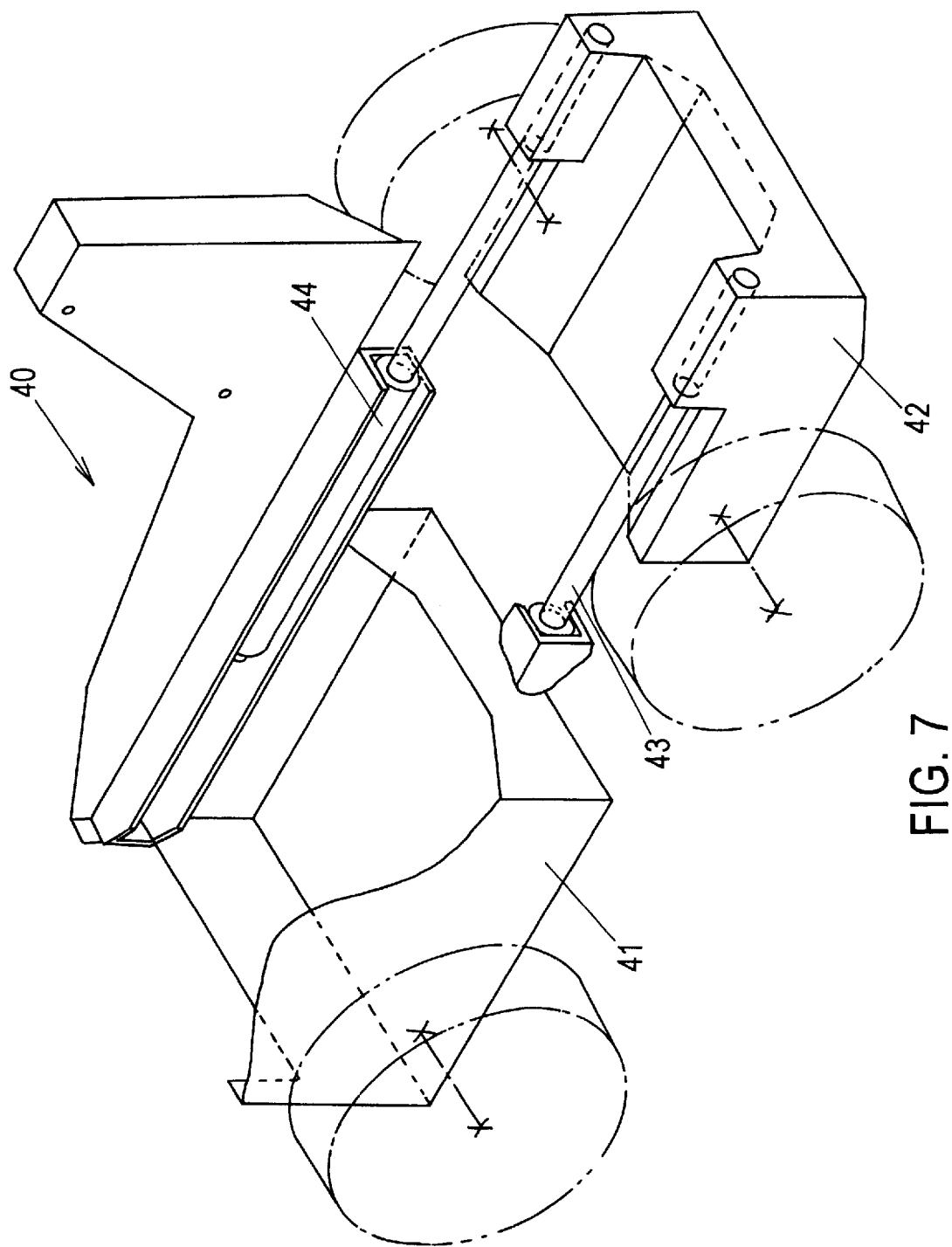

FIG. 7 shows a rear schematic isometric view of a variable geometry vehicle having two telescopic extension members. Skid steer vehicle 40 comprises body member 42, wherein body member 42 moves rearwardly relative to body member 41 in response to dual extension assemblies 43 and 44. Where dual extension assemblies are shown it is preferable that these be disposed symmetrically about the longitudinal mid line of the vehicle to ensure that binding is prevented during the extension phase. The extension assemblies 43 and 44 operate in a similar manner for that described for extension assembly 9 shown in the vehicle in FIG. 1.

Due to the displacement of body member 8 relative to body member 7 as shown in FIG. 1, the wheel base of the vehicle is extended rendering the vehicle more stable during use. Also contributing to the counterbalance of the vehicle is not only the rearward movement of the rear wheel assemblies but also the rearward movement of the drive assembly including the drive motor 13 and associated hydraulic transmission and pumps 13a and 14 respectively.

Figure 8:
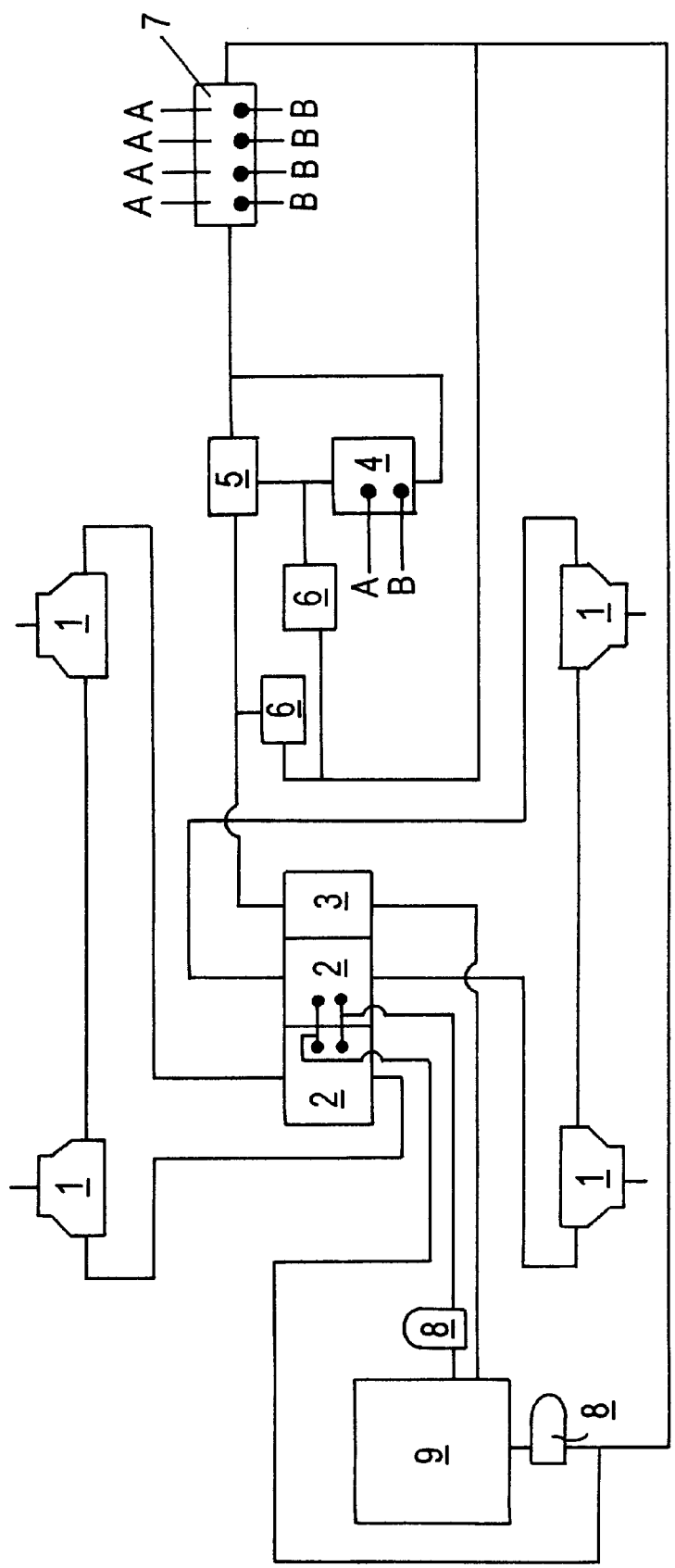

FIG. 8 shows a schematic arrangement of the hydraulic system for a variable geometry vehicle with hydraulics to accommodate actuation of an extension assembly.

Figure 9:
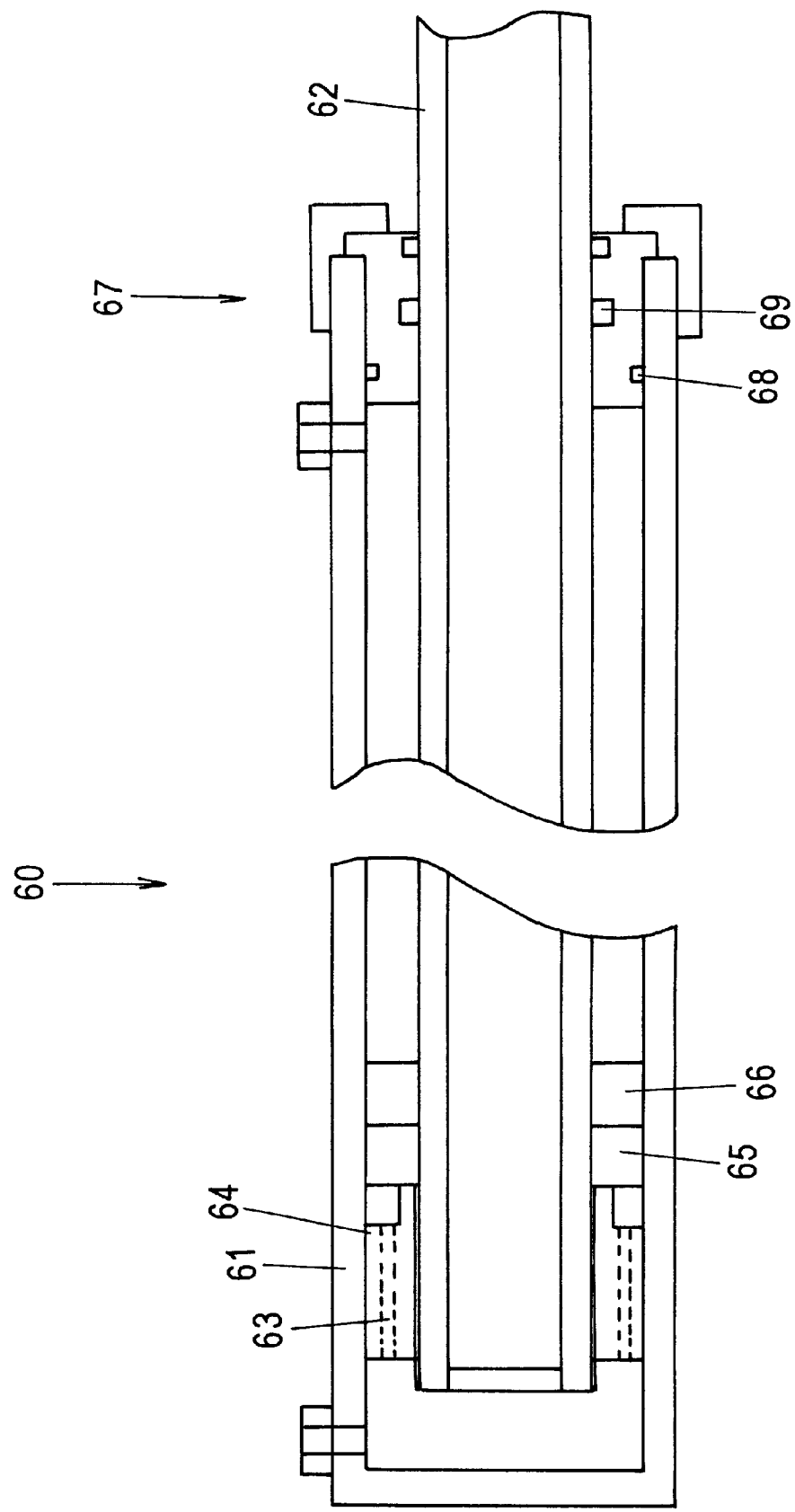

Referring to FIG. 9 there is shown a cross sectional plan view of a telescopic member 60 according to one embodiment. According to this embodiment the telescopic member provides the structural strength required for the extension and retraction facility. Member 60 comprises member 61 which is fixedly attached to the body of a vehicle. This acts as the fixed member of the telescopic member whilst member 62 moves telescopically and relative to member 61. Member 62 attaches to the body member of the vehicle which displaces. Member 60 further comprises oil gallery 63, guide block 64 and (hidden) piston and seals 65 and 66. At end 67 of member 61 there are provided cylinder seals 68 and 69.

Figure 10:
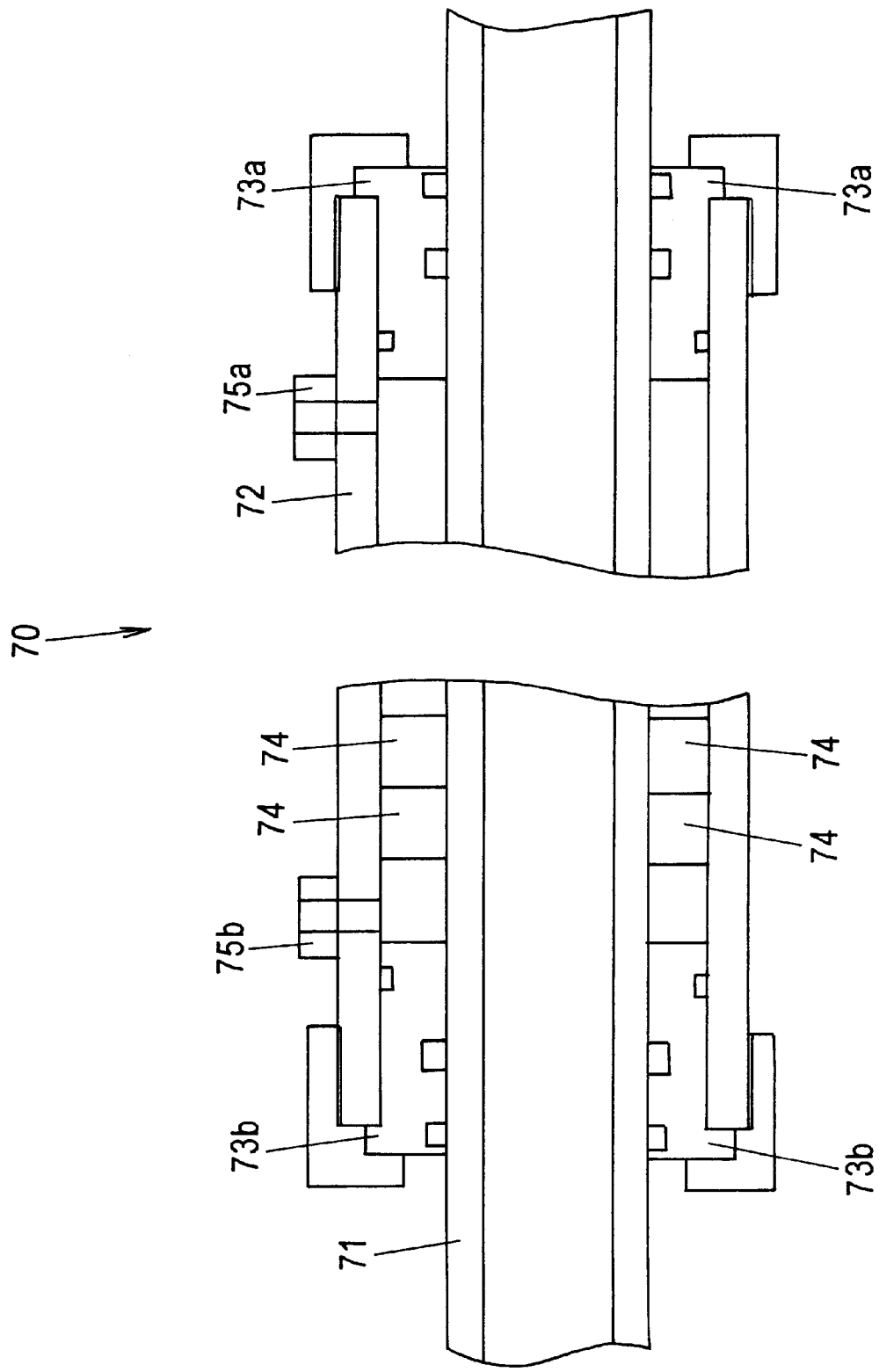
FIG. 10 shows a cross sectional plan view of a telescopic member according to a preferred embodiment.

FIG. 10 shows a cross sectional plan view of a telescopic member according to a preferred embodiment. The telescopic member 70 comprises a female hydraulic cylinder 72, which houses hollow rod guides 73a and 73b. Guides 73a and 73b are the principal support contact areas of hollow rod 71. All radial movement of hollow rod 71 is controlled by guides 73a and 73b, while allowing and providing slideable contact areas for the relative movement between hollow rod 71 and female cylinder 72. Fixedly attached to hollow rod 71 is (hidden) piston and piston seals 74, and upon the introduction of hydraulic fluid, with pressure through inlet or outlet ports of either 75a or 75b the said fluid pressure, acting on the piston 74 thereby causes relative movement between female cylinder 72 and 71. Guides 73a and 73b incorporate identical sealing techniques used in conventional cylinders.

The telescopic members of FIGS. 9 and 10, in addition to providing the extension capability for the vehicle to which these may be attached, also provide a rigid structural member which imparts structural rigidity to the vehicle particularly when in the extended configuration. In the unextended and extended configuration the structural telescopic member also provides junction between the main body members of the vehicle.

Figure 11:
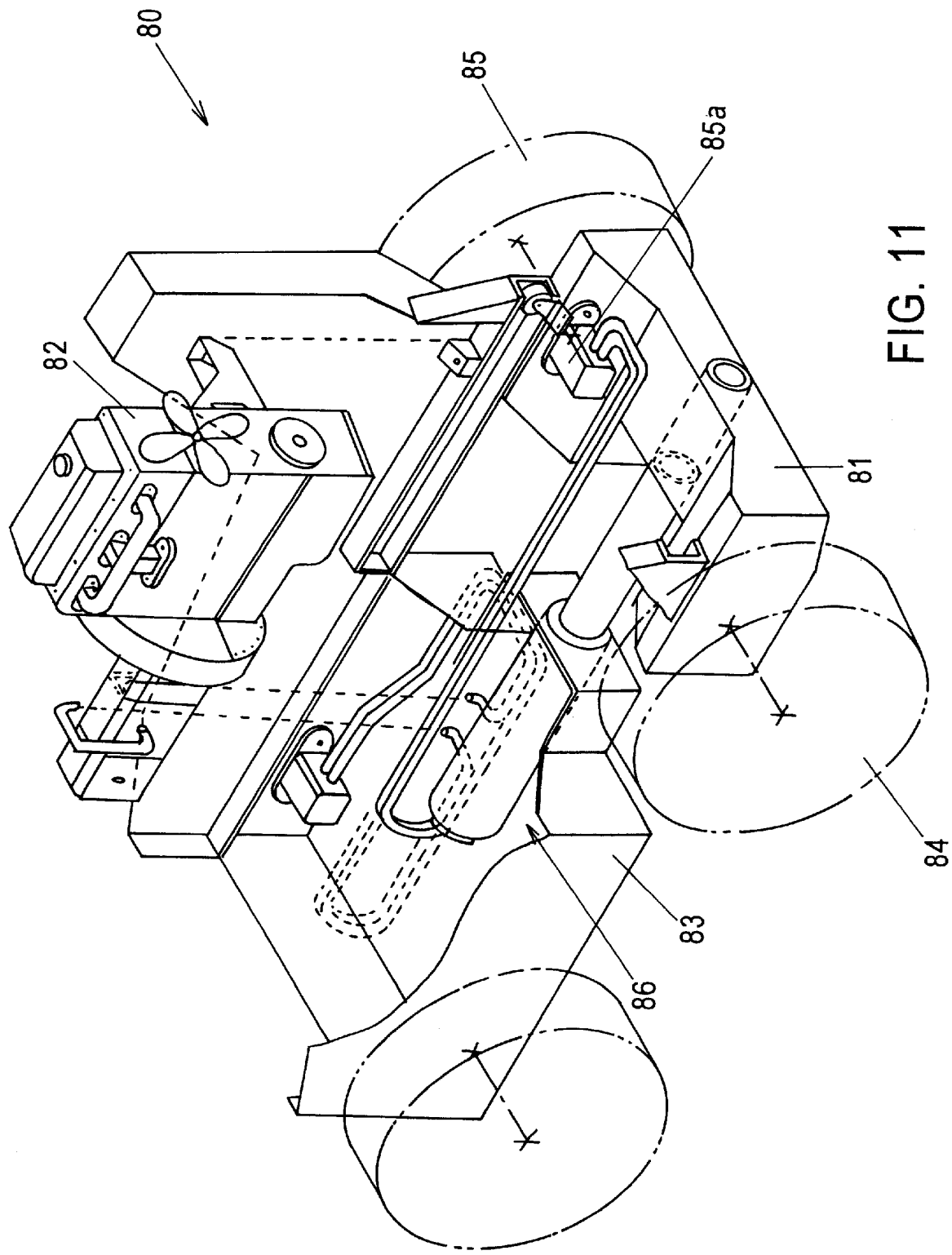
FIG. 11 shows an isometric exploded view of a skid steer vehicle in the extended configuration wherein the rear body member and wheel assemblies move relative to the drive motor.

FIG. 11 shows an isometric exploded view of a skid steer vehicle in the extended configuration wherein the rear body member and wheel assemblies move relative to the drive motor. The vehicle 80 of FIG. 11 is similar in general respects to the embodiment shown in FIG. 1 but this time the rearward extension of the body member 81 is independent of the drive motor 82. Thus, body member 81 moves rearwardly whilst motor 82 remains fixed in position and attached directly to body member 83. The extension of rear body member 81 includes movement rearward of wheel assemblies 83 and 85 which are integral with body member 81. Wheel motor 85a is shown in conjunction with wheel assembly 85. Extension assembly 86 operates as a structural beam in a similar manner for that described with reference to the corresponding extension assembly 9 for the vehicle of FIG. 1. When the rear body member 81 extends relative to body member 83 and motor 82 additional counterbalance is provided for loads applied at the front of the vehicle albeit less than the counterbalance provided when the motor also moves rearward as described with reference to FIG. 1.

Figure 12:
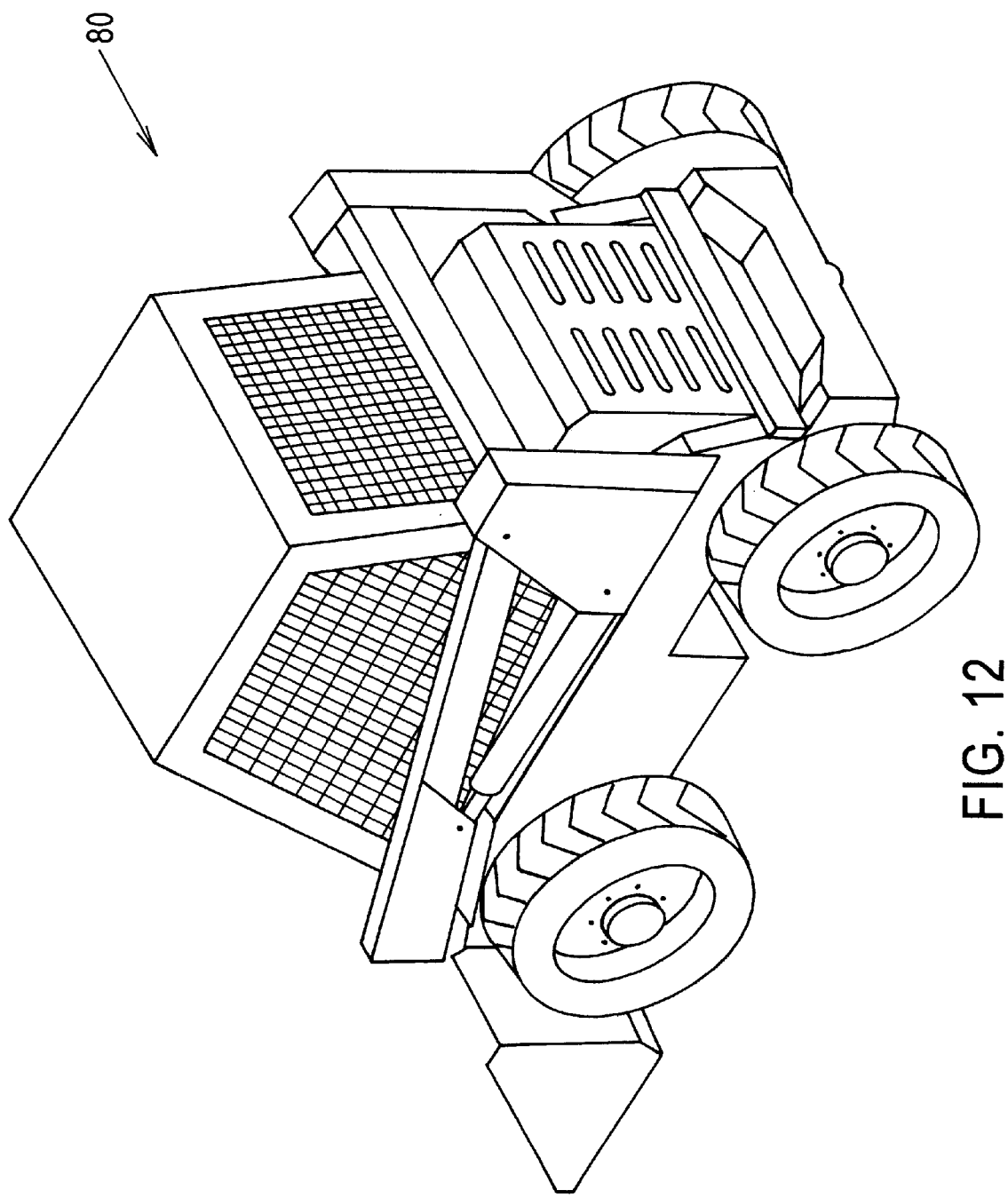
FIG. 12 shows fully assembled, the vehicle of FIG. 11.

FIG. 12 shows the vehicle 80 of FIG. 11 fully assembled.

Figure 13:
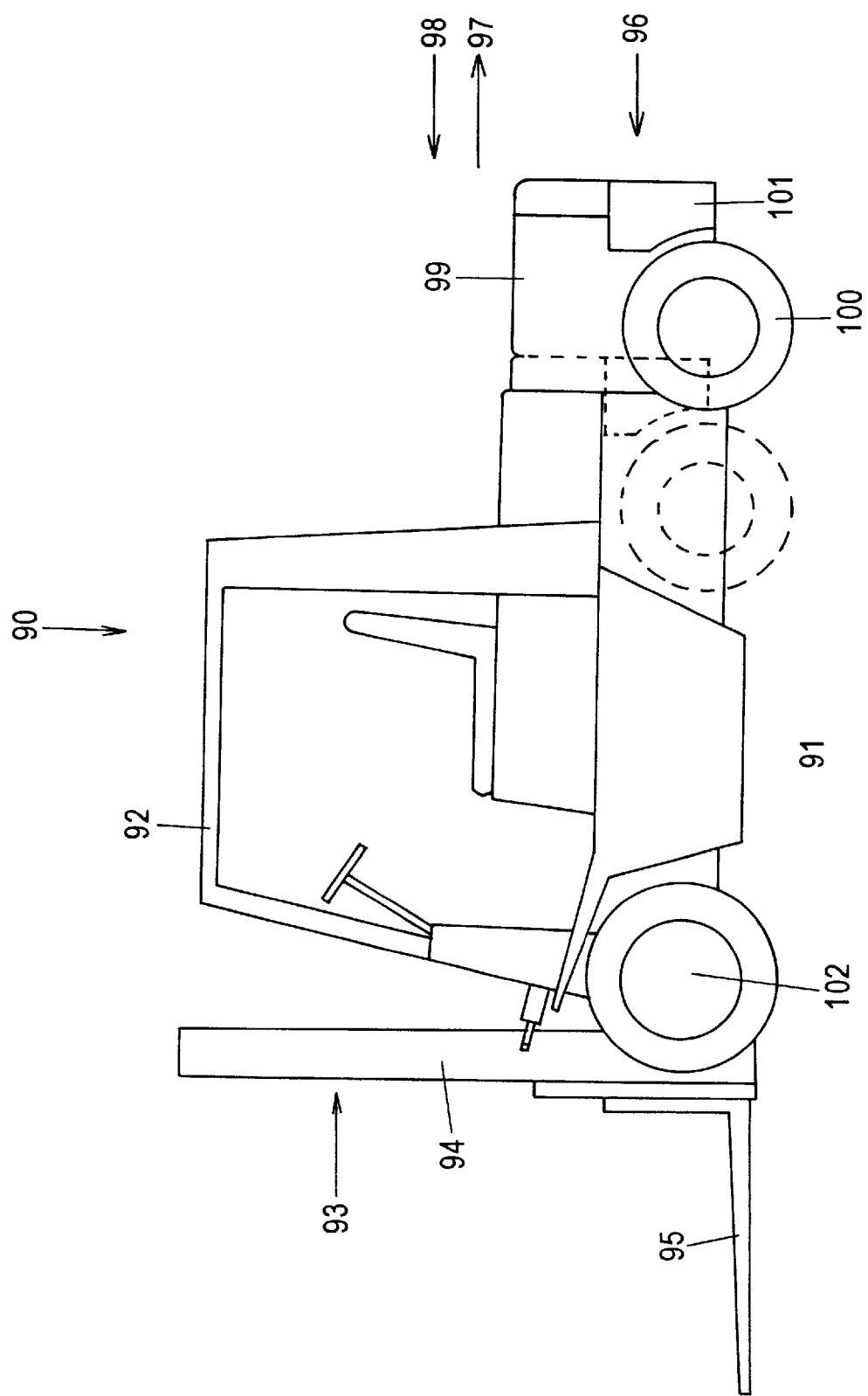
FIG. 13 shows a side elevation of a fork lift vehicle according to an alternative embodiment of the invention.

FIG. 13 shows a side elevational view of a fork lift vehicle 90 to which is adapted the extension and retraction facility according to an alternative embodiment of the invention. Fork lift vehicle 90 comprises a body 91 over which is placed a control cabin 92. Fork lift vehicles usually comprise a fork lift assembly 93 comprising a generally upright mainframe structure 94 and lifting forks 95. These are usually operated hydraulically and apply significant load forward of the front wheel axis 101. In normal use, this can create a tendency for the fork lift vehicle to overturn longitudinally and requires operator skill to ensure that the machine is kept in balance. Traditionally, as with short wheel base vehicles, in stability is a complication for an operator to deal with. By incorporating the extension assembly and the ability to increase the wheel base of the fork lift, the stability of the vehicle is dramatically improved due to additional counterbalance particularly when forks 95 are under load. Fork lift 90 includes moveable member 96 which is able to move rearward in the direction of arrow 97 and forwards in the direction of arrow 98 when the vehicle is to be restored to its original configuration. As a result of the inclusion of the extension assembly (not shown in FIG. 9) the vehicles wheel base can be extended for distances up to 1200 mm and beyond within reasonable limits. The positioning of body member 96 is determined by the operator according to the amount of counterbalance required to overcome any tendency to overturn longitudinally induced by loading on forks 95. Body member 96 includes thereon drive motor 99 and associated hydraulic pumps (not shown) along with rear wheels 100 and associated mechanisms (not shown) and counterweight 101. Each of these members of the body member 96 provide additional counterbalance when the vehicle is in the extended configuration for loads lifted by forks 95. With this arrangement the vehicle is provided with improved stability and increased versatility in performing functions which could not be safely performed when the vehicle is in the unextended configuration.

The foregoing description with reference to FIG. 1 describes the movement of body member 8 relative to body member 7. It will be appreciated that the vehicle could be redesigned such that the body member 7 moves relative to body member 8. In this configuration, member 11 of telescopic member 10 would be fixedly attached to body part 8 and member 12 would be connected to body member 7 being the moveable member and would allow relative movement of body member 7 relative to body member 8. This also applies to the alternative embodiments of the invention described herein.

In an alternative embodiment the telescopic member adapted for use with the extension assembly may comprise a telescopic structural beam preferably of generally square or rectangular cross section which is fixed to the body members and contains a hydraulic cylinder therein which operates in response to the drive assembly to facilitate movement of a moveable member which travels inside the beam.

During use, the operator selects the desired distance apart for body members 7 and 8 (see FIG. 1) and this is generally determined according to use conditions. For instance, where a load is heavy or is carried high by a front end loading implement, body members 7 and 8 will be at maximum extension to resist instability and particularly the tendency to overturn when climbing slopes. The operator may adjust the speed at which the extension and retraction takes place. Thus, the speed is adjustable and pre-set before the extension takes place or it may be adjusted at any time during the extension and retraction operation. The adjustment is ideally effected by a flow control valve and may fall within the range 0.001 cm per second up to 1 meter per second according to requirements. Speeds outside this range are also possible.

According to an alternative embodiment, the telescopic member may comprise a steel box section or alternatively a circular section. The size of the extension assembly can be altered according to the size of the machine although where the invention is applied to a skid steer loader an ideal size for the telescopic member would either be 150 mm in diameter or if a box section is used, 150 mm by 150 mm. It is envisaged that the vehicle can be extended a number of feet and preferably over a range of between 0 to 1200 mm although larger extensions are feasible.

When the wheel base is fully extended loads applied to the front end of the vehicle are more effectively counterbalanced enabling the machine to pick up more weight and consequently operate with a larger bucket compared to the maximum bucket and load capability for the conventional skid steer loader. One advantage of the variable geometry vehicle is that due to the particular type of variable geometry applied in accordance with the invention a smaller vehicle with a wider capability can be used as a substitute for a larger vehicle. Furthermore, due to the extension of the wheel base, greater traction is achieved so that in the event that the vehicle became bogged in sandy or muddy ground an operator can instantly adjust the wheel base transferring the loading on the machine and the position of engagement between the tires and the ground surface to facilitate extraction of the machine.

The working flexibility of the invention is manifested in being able to retract rapidly when turning, and extend rapidly when additional stability is required when loading, climbing or simply travelling across difficult terrain.

It will be recognised by persons skilled in the art that numerous variations and modifications may be made to the invention without departing from the overall spirit and scope of the invention as broadly described herein.

What is claimed is:

1. A mobile vehicle for lifting a load, comprising:
   a vehicle body including front and rear wheel assemblies each including at least a pair of wheels supporting respective front and rear vehicle body parts;
   an implement attached to the vehicle body for lifting said load;
   a drive motor mounted on the vehicle;
   an extension and retraction assembly responsive to actuation of the drive motor and mounted within said vehicle body;
   a controller for actuating the extension and retraction assembly responsive to an input from an operator of the vehicle;
   wherein the extension and retraction assembly allows the vehicle to move between a retracted state in which the extension and retraction assembly is fully retracted and the body parts are in opposition and where a wheel base distance is at a minimum for the vehicle and an extended state in which the extension and retraction assembly is fully extended so that the body parts are at least partially separated and the wheel base is set at a maximum for the vehicle; wherein, when the vehicle is extended, one wheel assembly supporting one of said body parts is displaced relative to the other wheel assembly supporting the other body part, the drive motor providing counterbalance for said load and resistance against overturning under said load, wherein at least one wheel of one or both said wheel assemblies includes at least one wheel motor and wherein hydraulic hoses between a controlling pump mounted on one of the front and rear body parts and said at least one wheel motor displace to accommodate displacement of the body parts.

2. A vehicle according to claim 1 wherein the front and rear body parts each receive a member of said extension assembly such that actuation of the extension assembly causes displacement of the rear body part of the vehicle relative to the front body part.

3. A vehicle according to claim 2 wherein the front and rear wheel assemblies support the respective front and rear body parts and wherein the drive motor is mounted on the rear body part and moves with said rear body part.

4. A vehicle according to claim 3 wherein the extension assembly comprises a hydraulically operated telescopic member having a fixed member fixed to the front body part and a movable member fixed to the rear body part.

5. A vehicle according to claim 1 further comprising said controlling pump being a hydraulic pump driven by the drive motor and being linked to the extension assembly via hydraulic hoses in communication with at least one control valve.

6. A vehicle according to claim 5 wherein the hydraulic hoses between said hydraulic pump and control valve move to accommodate displacement of said rear body part.

7. A vehicle according to claim 6 wherein two fixed hydraulic hoses link the control valve to the telescopic member forming the extension and retraction assembly.

8. A vehicle according to claim 7 wherein the telescopic member includes therein a hydraulic cylinder which extends and retracts to facilitate extension and retraction of said extension assembly.

9. A vehicle according to claim 8 wherein each body part includes two independently driven wheels.

10. The vehicle of claim 1, wherein said extension and retraction assembly is mounted entirely within, without protruding upwardly from, the vehicle body.

11. A vehicle for lifting loads, comprising:
    a vehicle body comprising front and rear body parts;
    carriage means for said vehicle body comprising front and rear wheel assemblies, each including at least a pair of wheels;
    a drive motor mounted on the vehicle;
    a load lifting implement attached to said body for lifting said loads;
    an extension and retraction assembly responsive to the drive motor and fitted within the body of the vehicle thereby allowing the vehicle to move responsive to an input from an operator of the vehicle between a retracted state in which a wheel base of the vehicle is at a minimum and the extension and retraction assembly is fully retracted, and an extended state where the wheel base distance is at a maximum and the extension and retraction assembly is fully extended;

wherein in said extended state the rear wheel assembly is rearwardly displaced relative to the front wheel assembly, wherein the extension and retraction assembly causes the vehicle body to part into front and rear body parts each of which are connected to the extension and retraction assembly and which are supported by the front and rear wheel assemblies respectively;

wherein the drive motor moves with the rear body thereby providing counter balance against vehicle instability, wherein each wheel includes a wheel motor and hydraulic hoses between a controlling hydraulic pump located on one of said front and rear body parts and at least one wheel motor moves to accommodate displacement of the moveable body parts.

12. A vehicle according to claim 11 wherein the hydraulic pump is driven by the drive motor and is linked to the extension assembly via hydraulic hoses which join the pump to control a valve.

13. A vehicle according to claim 12 where the hydraulic hoses between the pump and control valve move to accommodate displacement of said rear body relative to the front body part.

14. The vehicle of claim 11, wherein said extension and retraction assembly is mounted entirely within, without protruding upwardly from, the vehicle body.

15. A skid steer vehicle according to claim 14 wherein the front and rear parts body together form the vehicle body each of which body parts are attached to a member of said extension assembly such that actuation of the extension assembly causes longitudinal displacement of the rear part relative to the front body part.

16. A skid steer vehicle according to claim 15 wherein the extension assembly includes at least one telescopic member having one member fixed to the front body part and a moveable member fixed to the rear body part, wherein the telescopic member is hydraulically operated.

17. The vehicle of claim 11, wherein said vehicle is a skid steer vehicle.

* * * * *